(12) United States Patent
Alley et al.

(10) Patent No.: US 8,581,981 B2
(45) Date of Patent: Nov. 12, 2013

(54) OPTICAL IMAGING SYSTEM FOR UNMANNED AERIAL VEHICLE

(75) Inventors: Kevin Alley, San Antonio, TX (US); Roger Lopez, La Vernia, TX (US); Richard Somers, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 1356 days.

(21) Appl. No.: 11/740,743

(22) Filed: Apr. 26, 2007

(65) Prior Publication Data

US 2009/0015674 A1    Jan. 15, 2009

Related U.S. Application Data (60) Provisional application No. 60/745,932, filed on Apr. 28, 2006.

(51) Int. Cl.
*H04N 7/18* (2006.01)

(52) U.S. Cl.
USPC ........... 348/144; 348/145; 348/146; 348/147; 348/400.1; 348/401.1; 348/402.1; 348/403.1; 348/404.1; 375/240.01; 375/240.04; 375/240.05; 375/240.08; 375/240.12; 375/240.14; 375/240.15; 375/240.16

(58) Field of Classification Search
USPC .......................... 348/400.1–404.1, 144–147; 375/240.01–240.16
See application file for complete search history.

(56) References Cited

U.S. PATENT DOCUMENTS

| 4,495,589 | A | * | 1/1985 | Hirzel | 702/144 |
|---|---|---|---|---|---|
| 5,001,348 | A | * | 3/1991 | Dirscherl et al. | 250/372 |
| 7,015,954 | B1 | | 3/2006 | Foote et al. | 348/218.1 |
| 7,098,458 | B2 | * | 8/2006 | Kuerbitz et al. | 250/330 |
| 2002/0012071 | A1 | * | 1/2002 | Sun | 348/578 |
| 2005/0177307 | A1 | * | 8/2005 | Greenfeld et al. | 701/220 |
| 2006/0016966 | A1 | * | 1/2006 | Hughes et al. | 250/221 |
| 2006/0022986 | A1 | * | 2/2006 | LinneVonBerg et al. | 345/537 |

* cited by examiner

*Primary Examiner* — Phuoc Nguyen
*Assistant Examiner* — Clarence John
(74) *Attorney, Agent, or Firm* — Chowdhury & Georgakis P.C.; Ann C. Livingston (57) ABSTRACT

An optical imaging system and associated methods for capturing images from an aircraft, such as a UAV. A camera unit on-board the aircraft is remotely controlled from an image control station. The image control station receives image data from the camera unit, and also delivers control signals for determining a viewing mode of the image.

12 Claims, 8 Drawing Sheets

OPTICAL IMAGING SYSTEM FOR UNMANNED AERIAL VEHICLE

RELATED PATENT APPLICATION

This application claims the benefit of U.S. Provisional Application No. 60/745,932, filed Apr. 28, 2006 and entitled "Optical Imaging System for Unmanned Aerial Vehicle."

TECHNICAL FIELD OF THE INVENTION

This invention relates to optical imaging, and more particularly to an optical imaging system especially designed for use in a small unmanned aerial vehicle (UAV).

BACKGROUND OF THE INVENTION

For troop protection, military surveillance missions often use autonomous vehicles, such as unmanned aerial vehicles (UAV's). The UAV flys a short low altitude flight, and uses an on-board camera system to acquire images, which it then delivers to a ground station.

A typical UAV camera system is a color system that is implemented with commercial off-the-shelf products. Some UAV's have a gimbaled pan/zoom/tilt (PZT) camera to acquire images. These cameras have a larger field of view (FOV) than fixed mount cameras, and thus decrease the amount of flight time required to observe a given area.

For small UAV's, the cameras are typically implemented with fixed mount systems, because size, weight, and power restrictions preclude the use of gimbaled systems. With a fixed mount camera, the FOV is smaller and the UAV must stay airborne longer to retrieve the same data as compared to a UAV with a gimbaled system.

Approved radio use for military datalinked imagery has driven small UAV video format to the analog National Television System Committee (NTSC) standard. This format limits the image on the ground station monitor to 640×480 pixels.

As a result of these constraints, present-day missions for small UAVs are limited to narrow, non-zoom field-of-view (FOV) images and ground area coverage. Longer flight times are required to complete reconnaissance, surveillance, and other mission objectives typically assigned to small UAVs.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

As explained below, the system and method described herein use one or more fixed image sensors to implement an on-board UAV camera. Images are acquired, processed, and delivered to a ground station in accordance with military (NTSC) formats. The images are processed and manipulated in a manner that provides the user with a wide selection of view modes. The design of the system addresses various issues that arise for UAV-mounted camera systems, such as of weight, size, low power usage, as well as communications with a ground station.

System Overview

Figure 1A:
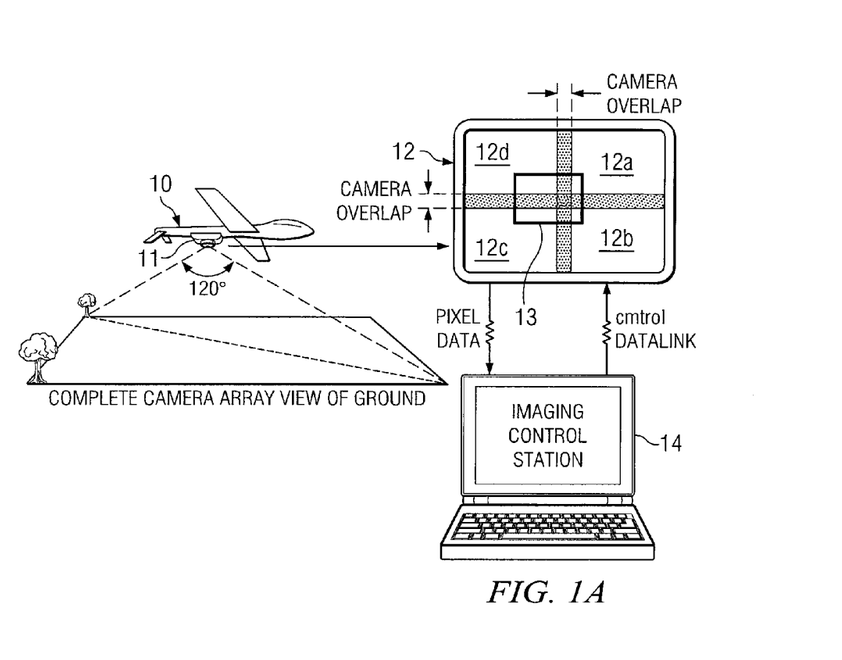
FIG. 1A illustrates a UAV having an on-board camera unit in communication with a remote image control station in accordance with the invention.

FIG. 1A illustrates a UAV 10 having an on-board camera unit 11 in communication with a remote ground-based image control station 14 in accordance with the invention. Camera unit 11 produces images 12, and a selected ROI 13 from image 12 is transmitted to the image control station 14.

Figure 1B:
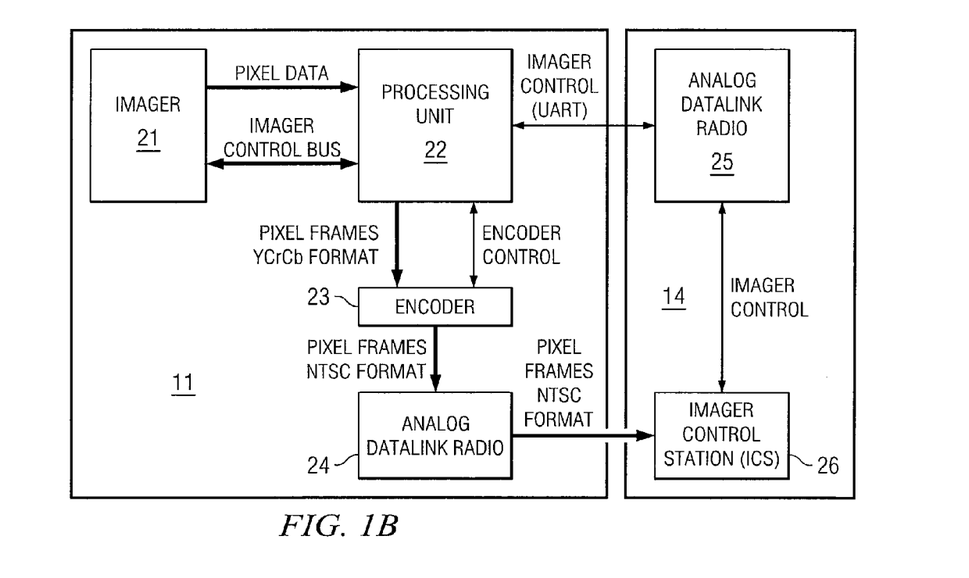
FIG. 1B illustrates the camera unit, image control station, and the datalinks between them, in further detail.

FIG. 1B illustrates camera unit 11, image control station 14, and the datalinks between them, in further detail. The imager 21 of camera unit 11 comprises one or more image sensors and associated lens(es). Imager 21 outputs pixel data, along with a pixel clock and horizontal synchronization to synchronize a processing unit 22. A serial bus between the imager 21 and processing unit 22 permits processing unit 22 to control the imager 21.

A radio datalink is used for transmission of pixel data from camera unit 11 to image control station 14. The datalink provides for NTSC-type analog transmission of frames (640× 480 pixels each) at a frame rate of 30 frames per second.

A second datalink delivers control data from the image control station 14 to the camera unit 11. In the example of FIG. 1B, camera unit 11 communicates with image control station 14 by using a Universal Asynchronous Receiver Transmitter (UART). A UART on each end of a transmission cable serializes data for transmission and de-serializes data upon receipt.

When processing unit 22 receives a serial input from control station 14, it sends a Serial Camera Control Bus (SCCB) signal to control imager 21. As determined by a selected viewing mode, the control signal controls where a data readout begins, and the zoom, if any. As a result, only the data for a desired subframe is transferred from the imager 21 to the processing unit 22.

Processing unit 22 has at least two main functions. It performs image processing, and it provides for communication with other devices, including responding to control signals from image control station 14. Thus, processing unit has two main processing threads in operation. One thread does the video input, video processing, and video output. This thread is triggered by a timer, which operates at a desired frame rate, such as thirty frames per second. A second thread communicates with the image control station 14 and controls the imager 21. A command from the user triggers this thread, and causes processing unit 22 to control imager 21 based on the command. For example, processing unit 22 may be programmed to poll a UART after each frame to check for new commands.

Encoder 23 formats pixel data from processing unit 22 into analog NTSC format. A suitable communications interface between processing unit 22 and encoder 23 is an Inter-Integrated Circuit ($I^2C$) bus.

Transmitter 24 transmits the analog NTSC signal to the image control station 14. An example of a suitable transmission is an analog datalink radio transmission representing a 640×480 pixel frame.

Imaging control station 14 controls imaging and view displays. Referring again to FIG. 1A, a region of interest (ROI) 13 may be selected from the full field image 12 for viewing. Control station 14 is a computer-based system, programmed to allow the user to digitally pan, tilt, and zoom the ROI from the full field image 12. Control signals are transmitted, using a radio data link, to select and control camera unit 11.

For UAV applications, camera unit 11 must collect image data at resolutions that allow surface object identification while maintaining a reasonably fast data rate. Examples of these and other constraints on the design of camera unit 11 are: weight (one pound or less), power consumption (1 watt or less), field of view (75 degrees or more), frame rate (15 frames per second or more), resolution (12 megapixels or more), and bandwidth (NTSC radio link).

Referring specifically to the example of FIG. 1A, the field of view (FOV) of camera unit 11 is 120 degrees. The camera unit 11 acquires four images 12a-12d, which are "stitched" together to form a seamless single "full field view" image 12. The camera unit 11 is a "sensor array" type camera. The multiple sensors provide a large field of view without the weight associated with a mechanical gimbaled camera. By selecting a region of interest (ROI) from the full field view, the user can "virtually" pan, tilt, and zoom.

Referring again to FIG. 1B, imager 21 may be implemented with other types of image sensor configurations. An alternative embodiment, in which imager 21 is implemented with a single image sensor, is described below.

UAV Camera Unit with Sensor Array

Figure 2:
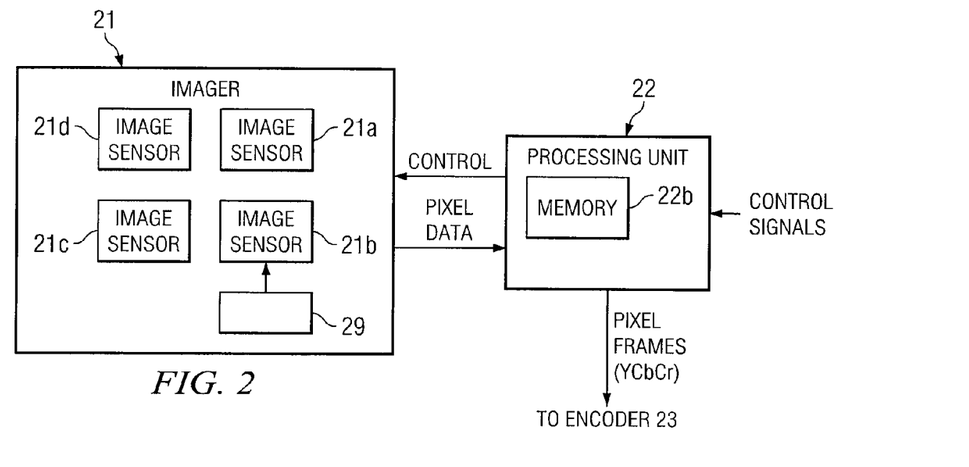
FIG. 2 illustrates a "multiple sensor" embodiment of the imager of the camera unit.

FIG. 2 illustrates a "sensor array" embodiment of the imager 21 of camera unit 11. A sensor array 21 has a number of image sensors 21a-21d. As explained below, the sensors are synchronized to capture images simultaneously. Processing unit 22 processes these images to simulate a single camera with a much larger aperture having pan, tilt, and zoom capabilities.

Sensors 21a-21d may be implemented with various types of digital image sensors, for example, CMOS image sensors. Each sensor produces a digital (RGB) output representing "raw" pixel data for an image frame.

The number of sensors of array 21 is optimized to provide a large field of view while consuming a minimum amount of power. Although there are fours sensors in the example of this description, the same concepts apply to a camera unit 11 having more or fewer sensors.

Each image sensor 21a-21d is also equipped with a lens holder and lens. The lens determines the field of view (FOV). To match the sensor's image-detecting ability to the lens' image-forming ability, the size, number, and distribution of the sensor's pixels are compared to similar quantities in the lens' image. In determining when such a match is optimal, various parameters are considered, including the FOV, the image resolution, and the image distortion.

In the example of this description, each image sensor 21a-21d has a lens that provides a 75 degree field of view. Thus, the total view of array 21 could be as large as 150 degrees. However, referring again to FIG. 1A, excess viewing angles of the sensors may be used to provide overlap of the images. In this example, the views are overlapped to provide a 120 degree field of view.

A specific example of a suitable image sensor 21a-21b is a five megapixel CMOS sensor available from Omnivision, Inc., capable of outputting pixel data at 30 frames per second with either 1280×480 or 640×480 resolution. The four sensors provide 20 megapixels per image, and for a 12 megapixel image size, not all of the sensor area need be used. An example of suitable lenses are lenses weighing 0.41 ounces each, for a total lens weight of 1.64 ounces.

An optional feature of image sensors 21a-21d is the control of registers 29 associated with each sensor, which permits each sensor's image to be zoomed, panned, or tilted. This ability to subsample the image of each sensor reduces overall computation demands.

Processing unit 22 comprises both data storage 22b and data processing elements. Pixel data from each sensor of array 21 is delivered to memory of processing unit, where it is stored and processed to form a single image. The combined image is reduced to a frame of 640×480 pixels. Depending on the image mode desired by the user at the ground station, and hence, on control signals from image control station 14, the desired image is selected as a panned, tilted, or zoomed image. Processing unit 22 also converts the color format of the pixel data to YCrCb data.

The memory component 22b of processing unit 22 comprises one or more frame buffers. The use of two frame buffers permits one set of four frames to be stored while another set is processed. The memory size for four frames at a resolution of 1280×480 (10 bits per pixel) is about 50 Mbytes. SRAM devices may be used to implement the memory of processing unit 22.

For image processing, processing unit 22 reads streaming bits from the sensors and places the data into predefined memory locations. It then performs image processing, including image transformation and data mapping. The image sensors stream image data in n-bit Bayer data format, with typical pixel sizes being 8 and 10 bits per pixel. From the n-bit Bayer data, 24-bit YUV (YCrCb) data is calculated.

For image processing, as explained in further detail below, processing unit 22 pre-processes the images from individual sensors 21a-21d, using one or more algorithms to perform tasks such as removal of lens distortion and registration of the sensors. Using the pre-processed images (in this case, four images), processing unit 22 stitches the images together. This processing may be performed using various algorithms. "One-step" processing techniques may be used. For example, a lookup table may be used to map uncorrected pixels to their final image locations.

Processing unit 22 then selects which pixels are to be used for the desired ROI for the desired viewing mode. It receives control signals from the ground station, via a receiver unit 25 for this purpose.

Processing unit 22 may be implemented with various processing devices, such as FPGAs (field programmable gate arrays), DSPs (digital signal processors), or GPUs (graphics processing units). DSPs are particularly suitable because of their low power consumption and strong processing power.

An example of a suitable processing unit 22 is an Analog Devices 600 MHz DSP, whose "worst case" power consumption is 400 milliWatts (mW).

In the example of this description, each image sensor 21a-21d streams 8-bit Bayer data to processing unit 22. Each pixel has a color filter, red, green, or blue. By alternating between two colors per row, a 24-bit RBG value can be interpolated for each pixel. RGB values can then be quickly converted to YCbCr. Various algorithms can be used to obtain RGB values from Bayer data. The simplest method is using the average of the surrounding pixels. Each pixel has a defined color and is surrounded by two pixels of the other colors (except on the borders). Appropriate programming could sequence through the Bayer data, calculate the averages for the surrounding pixel, and save the new data format into another memory location. This algorithm may be performed immediately before image transformations (discussed below), so the calculated YCbCr pixel may be mapped to its position in the corrected image.

As indicated above, for UAV imaging applications, power consumption is an important consideration. A reasonable constraint is a 1 W maximum. Suitable image sensors have been selected based on 130 mW power consumption specification for each sensor. If all sensors are running, this consumes 520 mW, leaving a balance of 480 mW to power processing unit 22 and other hardware of camera 11. Processing unit 22 is budgeted for a power consumption of approximately 400 mW.

Imager to Memory Data Path

Figure 3:
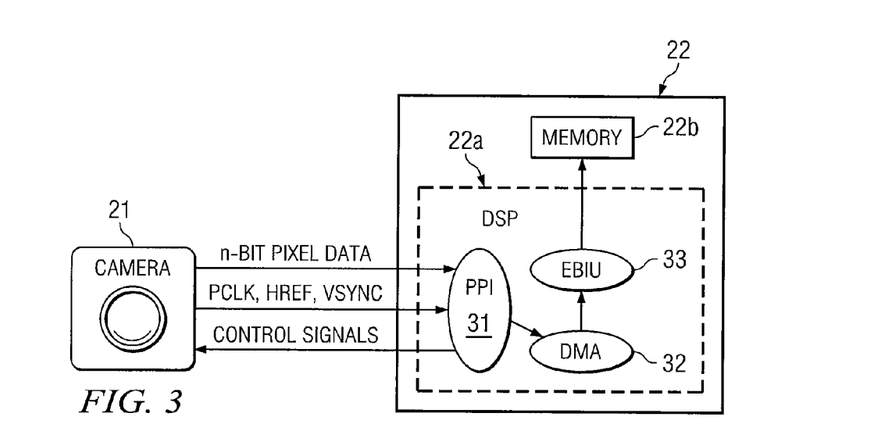
FIG. 3 illustrates the data and control interface between the imager and the processing unit.

FIG. 3 illustrates the data and control interface between imager 21 and processing unit 22. In the example of FIG. 3, processing unit 22 is implemented with a DSP 22a and SRAM 22b.

For n-bit pixels, n wires connect the n parallel bits of the imager 21 to processing unit 22. The pixel clock (PCLK) and the horizontal reference and vertical synchronization signals (HREF and VSYNC) control the timing of the video input.

The pixel data interface between imager 21 and processing unit 22 is a Parallel Peripheral Interface (PPI) unit 31. Various registers associated with processing unit 22 govern how the PPI unit 31 communicates with other devices. For example, a PPI control register defines how many sync signals are used, as well as their polarity (clocked on the rising or falling edge). Programmable control signals communicate with the image sensors via a control bus.

Direct memory access (DMA) unit 32 is another critical part of the data path. DMA channels allow for rapid reading and writing to memory 22b. A DMA configuration register specifies how to packet the information and how many packets to send per frame.

A next step in communication to SRAM 22b is the external bus interface unit (EBIU) 33. This element defines time constraints for writing to and reading from the SRAM 22b.

A typical DMA data transfer is 16-bit packets at a time, thus, two 8-bit pixels make up one DMA packet. For each frame, once the DMA has completed the pixel transfer (as defined by X count and Y count register of the DSP), an interrupt is generated and the process is complete.

For an imager having a sensor array, such as the imager 21 of FIG. 2, data input can be accomplished by multiplexing the sensors. A control signal from processing unit 22 can be used to switch between sensors. If sensors 21a-21c have the capability to operate in master and slave mode, clock signals may be linked between them. Once connected, processing unit 22 can read frames individually, sequencing through the sensors. Additionally, if desired, processing unit 22 can read each sensor's pixels sequentially. A suitable PPI interface can sample at 133 MHz, over four times faster than the pixel clock of the image sensors, allowing at least 4 pixels to be read per pixel clock.

Image Processing

Figure 4:
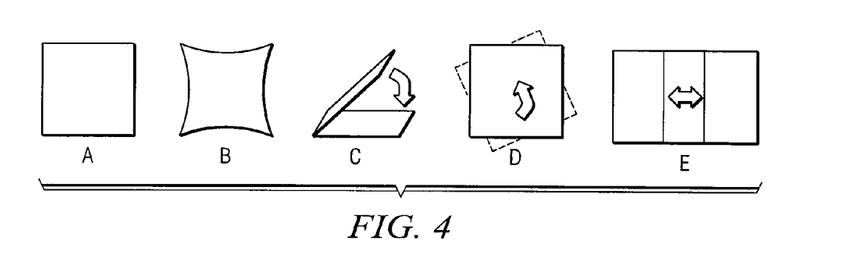
FIG. 4 illustrates image processing performed by the processing unit.

FIG. 4 illustrates the image processing performed by processing unit 22. The processing of FIG. 4 is for a camera unit 11 whose imager 21 has a sensor array, such as the imager of FIG. 2. However, apart from the stitching (Step E), the same concepts apply to processing for an imager having a single sensor.

For a sensor array imager, such as imager 21 of FIG. 2, the overall object of image processing is to merge the data of the multiple sensors 21a-21d, applying various transformations to remove distortion and perspective effects.

Image A represents the raw pixel data obtained from a single image sensor 21a. Camera unit 21 provides four such images. The transformation from A to B corresponds to any mathematical lens correction necessary due to effects of lens distortion. Image C depicts the transformation by which the camera images are projected to a unified surface, whether planar or spherical. The next transformation correct for any rotation between neighboring cameras. In the final step, image E, the images produced by the multiple cameras are stitched together.

A common stitching algorithm involves overlaying the selected images and performing a best-fit analysis of the overlapping pixels. The higher the correlation between top and bottom layers of pixels, the more seamless the resulting image will be. The stitching process can be quite computationally expensive. Therefore, it is beneficial to determine the stitching coefficients necessary to align the cameras once, use them for multiple frames, and recalculate them periodically to maintain alignment.

Ideally, the required series of transformations could be combined into one processing step involving a carefully created lookup table. The processing of Steps A-D could be performed in parallel for the four images. Processing unit 21 could be implemented with any number of parallel processing devices if desired for efficiency.

Image Processing; Lens Distortion Correction

As indicated by Steps A-B in FIG. 4, processing for lens distortion correction involves using a rectangular coordinate system for rectangular images.

In one processing embodiment, lens constants are derived before mounting the camera unit 11 in the UAV. Camera unit 11 is used to capture a grid with horizontal and vertical lines. A lens correction algorithm is applied to the image until the grid is most accurately reproduced.

Lens correction algorithms suitable for use by processing unit 21 may be developed with the use of commercially available software tools. For example, a Matlab toolbox for camera calibration has been developed at Caltech.

Image Processing; Projection to a Common Plane

Figure 5:
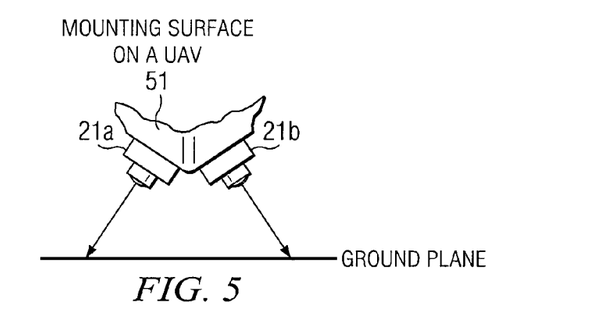
FIG. 5 illustrates two image sensors mounted on a UAV, and how their images are "tilted".

FIG. 5 illustrates two image sensors 21a and 21b mounted on a UAV, and how images become "tilted". As illustrated, the mounting location is selected for a particular view of the ground, as determined by the lens and features of the UAV, such as the curvature of the mounting surface 51 on the UAV. For ground images, the mounting is on the underside (or other downward facing surface) of the UAV. By considering both the effects of the outer geometry of the underside of the UAV and the lens angle, a desired full field view can be achieved with multiple sensors.

Each image sensor is directed towards a unique area on the ground to provide a large field of view. This arrangement, however, causes the resulting images to appear tilted with respect to one another because each camera has a different angle of incidence with the ground plane. To provide a clear final picture, the images from each camera must be mapped onto a common reference plane. This is done by applying a projection transformation that is unique for a given camera orientation.

Referring again to FIG. 3, Step C is a projection transformation that maps the images to a common plane. Various methods may be used for this transformation.

One projection method uses ray tracing to find the relative position of each image's corner pixels. The original image rectangle is mapped onto a quadrilateral defined by the corner pixel positions. Before further processing, the image is cropped to create a rectangular picture. A particular cropping rectangle is specified to produce images that are correctly aligned and that have a desirable pixel resolution. This method requires very accurate measurements of the orientations of the cameras.

A second method for mapping the images from all four cameras to a common reference plane requires a calibration process using a process similar to the lens correction calibration process described above. A user takes a test image for each camera of a checkerboard pattern. Then, using a calibration GUI, the user selects in the test images a quadrilateral region representing the desired viewing region. This quadrilateral region is then mapped to a 640×480 rectangle to produce the final image. By selecting the adjacent regions in each cameras test images, the final mapping produces image that are correctly aligned and may be directly stitched together.

Image Processing; Lookup Table

Referring to both FIGS. 2 and 3, the memory of processing unit 21 may have a lookup table to facilitate image processing. Because each image transformation is computationally intensive and most processing parameters are constant, a lookup table provides an efficient solution to time and processing power issues. Traditionally in image processing, a pixel position in the final image is selected and a mapping is determined back to the original picture. For example, pixel (1,1) in the new image may be composed of a weighted average of pixels (1,1), (1,2), (2,1), and (2,2). The lookup process uses the nearest neighbor approach to avoid additional computations due to the weighted average of pixels.

For mapping, a single pixel in the original image may be directly mapped to none, one, or multiple pixels of the final image. This mapping is determined by traversing each of the processing steps in order to produce the lookup table. An advantage of using a lookup table is that it can incorporate many individual processing steps and be executed in constant time.

Image Processing; Image Stabilization

Another image processing feature is image stabilization, which allows for images taken from the mobile UAV to appear to be taken from a stable platform by correcting for small movements of the UAV. Changes in the position of the aircraft can be delivered to processing unit 22, and the image processing software can be modified to correct for there changes in position.

Processing Unit

Figure 6:
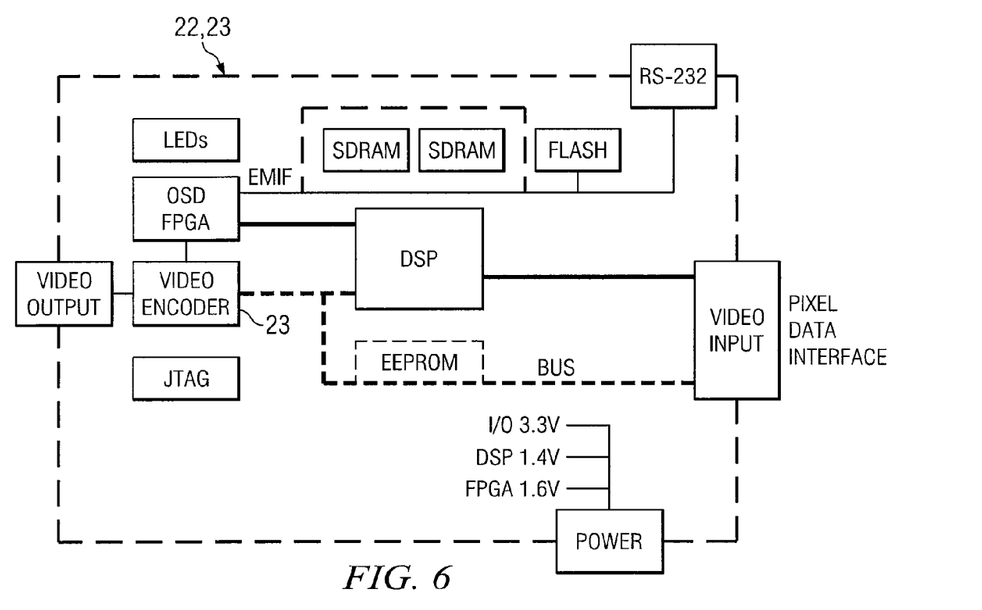
FIG. 6 illustrates an example of the processing unit and encoder of FIG. 1B, implemented on a single circuit board.

FIG. 6 illustrates an example of the processing unit 22 and encoder 23 of FIG. 1B, implemented on a single circuit board. The imager 21 is connected to the data input port, which receives its parallel Bayer pixel data.

From a video output port, output video data goes through a bus switch, through a FPGA, and into encoder 23. Processing unit 22 uses an I2C interface to control the imager 21 and encoder 23. An RS-232 line driver is used for communications with the imager control station 14. As explained above, an interface to SDRAM memory is used for frame buffering.

A JTAG port facilitates programming of the DSP. LEDs are used for debugging purposes.

Processing unit 22 may use either floating point or fixed point processing. Because operations using fixed point numbers require less power than floating point operations, a fixed point device may be desirable. However, the use of a fixed point processing unit requires the binary point to be followed and monitored. Binary point location monitoring may be built into the various image processing algorithms discussed below.

Image Control Station

As stated above, a user controls camera unit 11 from a remote image control station 14, which is typically a ground station. Control signals are delivered to camera unit 11 via a radio link.

Today's image sensors often have pan, tilt, and zoom capabilities, accomplished by adjusting on-chip registers. These registers are set to determine which pixels from an image are outputted. A 640×480 pixel frame may be selected at a particular x and y start position and a given zoom level. Processing unit 22 receives control signals and controls the frame selection process via left, right, up, down, zoom-in and zoom-out instructions.

Graphical User Interface

Figure 7:
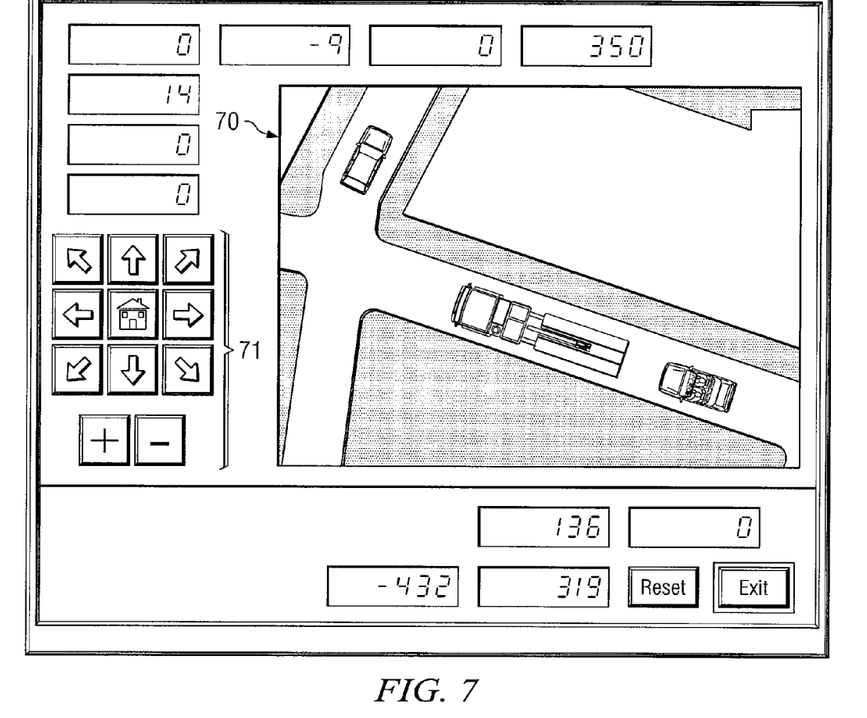
FIG. 7 illustrates an example of a display screen of a graphical user interface (GUI) implemented by programming of the image control station.

FIG. 7 illustrates an example of a display screen 70 of a graphical user interface (GUI) implemented by programming of the image control station 14. Buttons 71 permit the user to pan, tilt, and zoom. Holding down the pan and tilt buttons for longer causes the imager to pan and tilt faster. The GUI also displays the video stream. Clicking on the video display causes the imager to zoom in all the way to a view centered about the position clicked.

Viewing Modes

Figure 8:
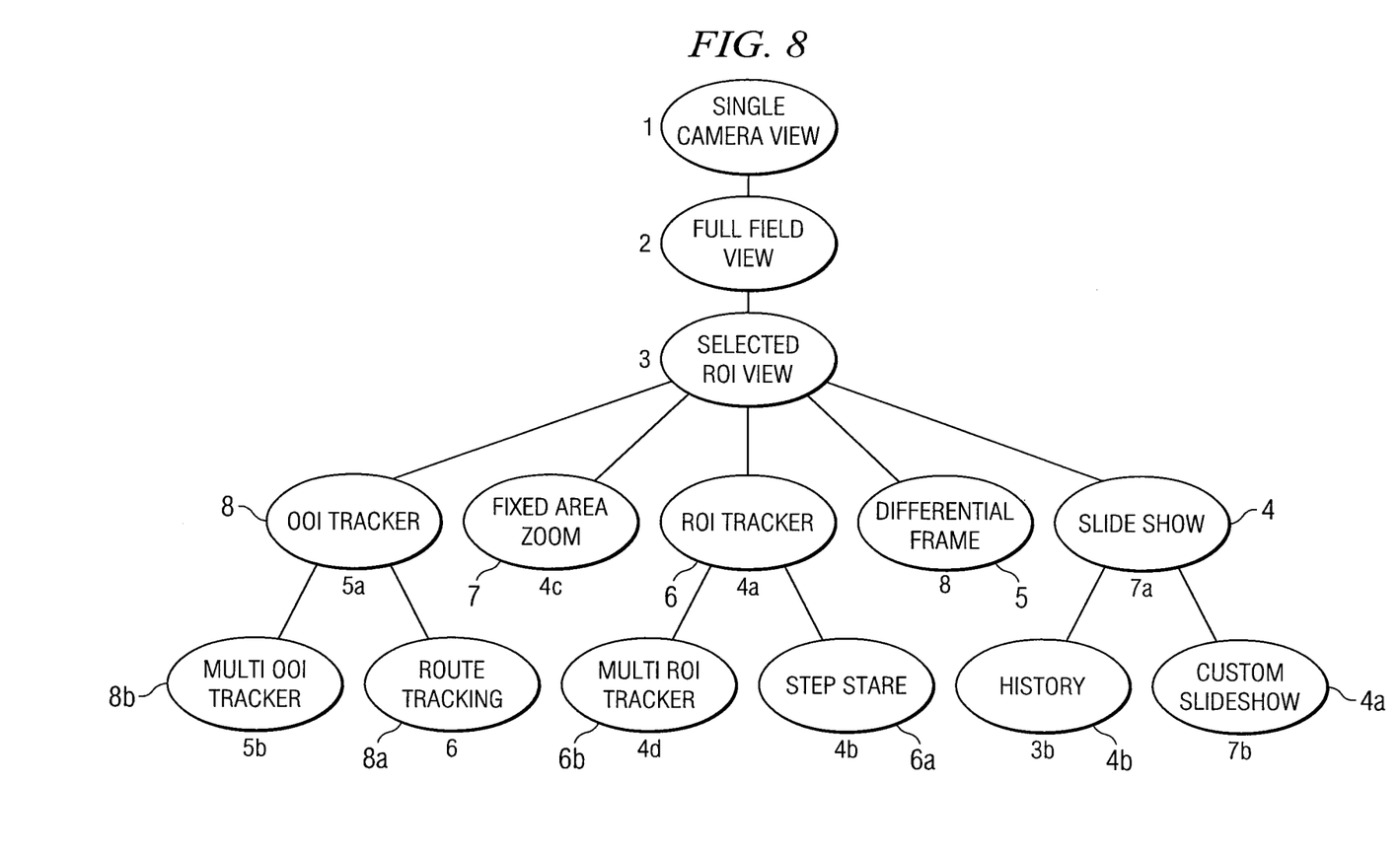
FIG. 8 illustrates the various viewing modes available to a user at the imaging control station.

FIG. 8 illustrates the various viewing modes available to a user at imaging control station 14, and the interdependence of these modes. It is assumed that imaging control station 14 is programmed with a suitable GUI to permit the user to easily navigate through the modes. The display at station 14 may display a reference rectangle on its screen, which represents the entire field of view available from camera unit 11.

Figure 9:
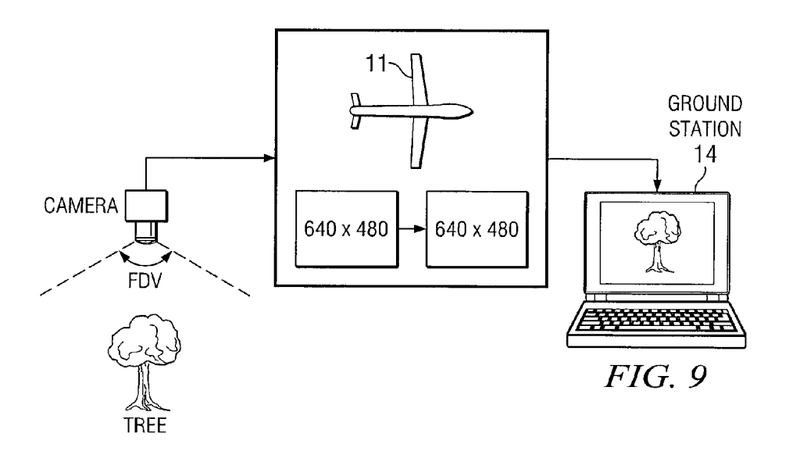
FIG. 9 illustrates a single sensor view mode (Mode 1 of FIG. 8).

FIG. 9 illustrates a single sensor view mode, in which the field of view from one image sensor 21a-21d is transmitted to the ground. The frame data is downsampled to a frame size of 640×480 pixels, using processing unit 22 or on-chip processing capabilities of the sensor. Distortion correction and image processing functions are applied by processing unit 22. Once the image is in the correct format, it is sent to image control station 14 at 30 frames per second. Where camera unit 11 is implemented with a sensor array, Mode 1 permits the user to switch the view between any of the four sensors 21a.

Figure 10:
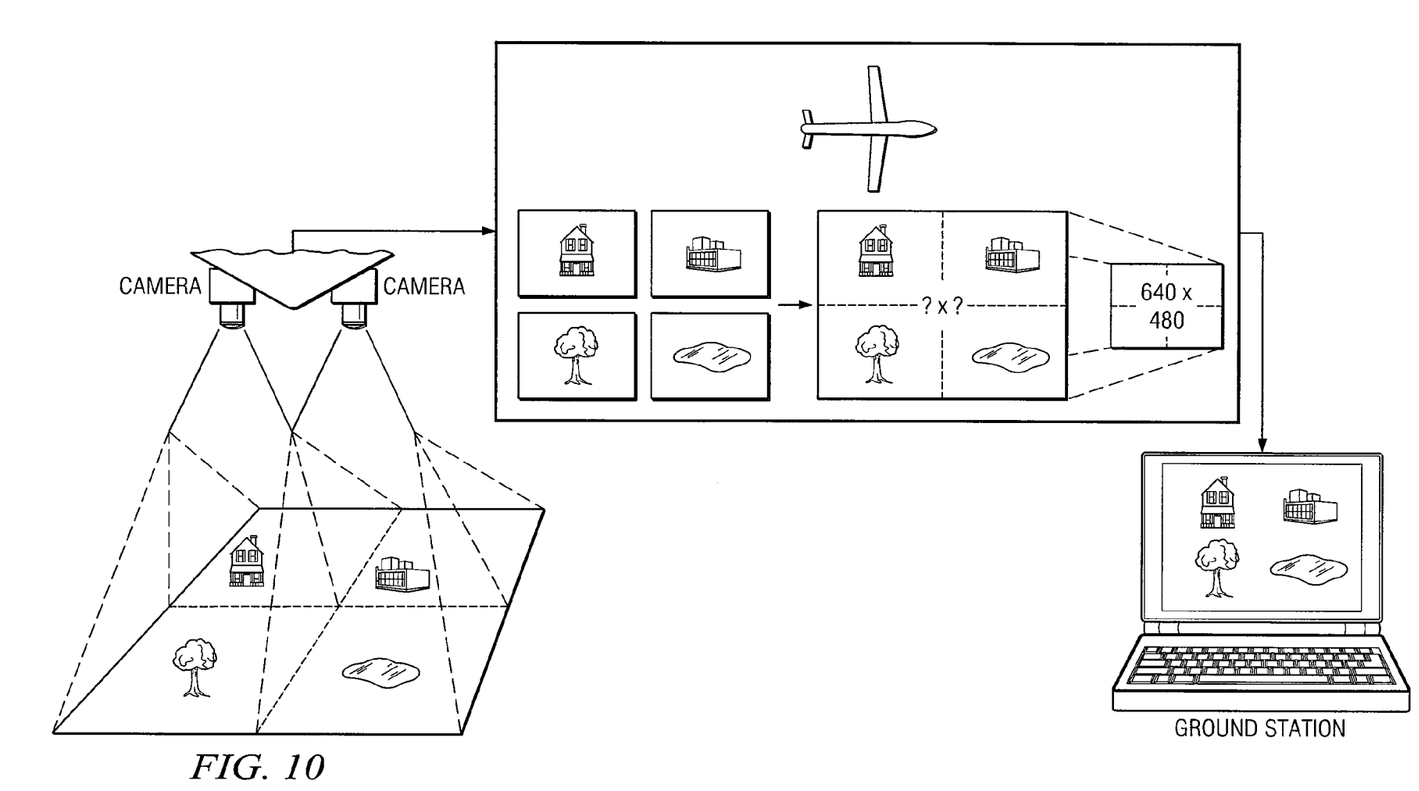
FIG. 10 illustrates a full field view (Mode 2 of FIG. 8).

FIG. 10 illustrates a full field view (Mode 2 of FIG. 8). This view combines the images from all sensors, using a 640×480 pixel output resolution. The distortion correction and image processing functions are applied, the combined image is scaled down to a resolution of 640×480 pixels, and the image is transmitted to the ground station.

Figure 11:
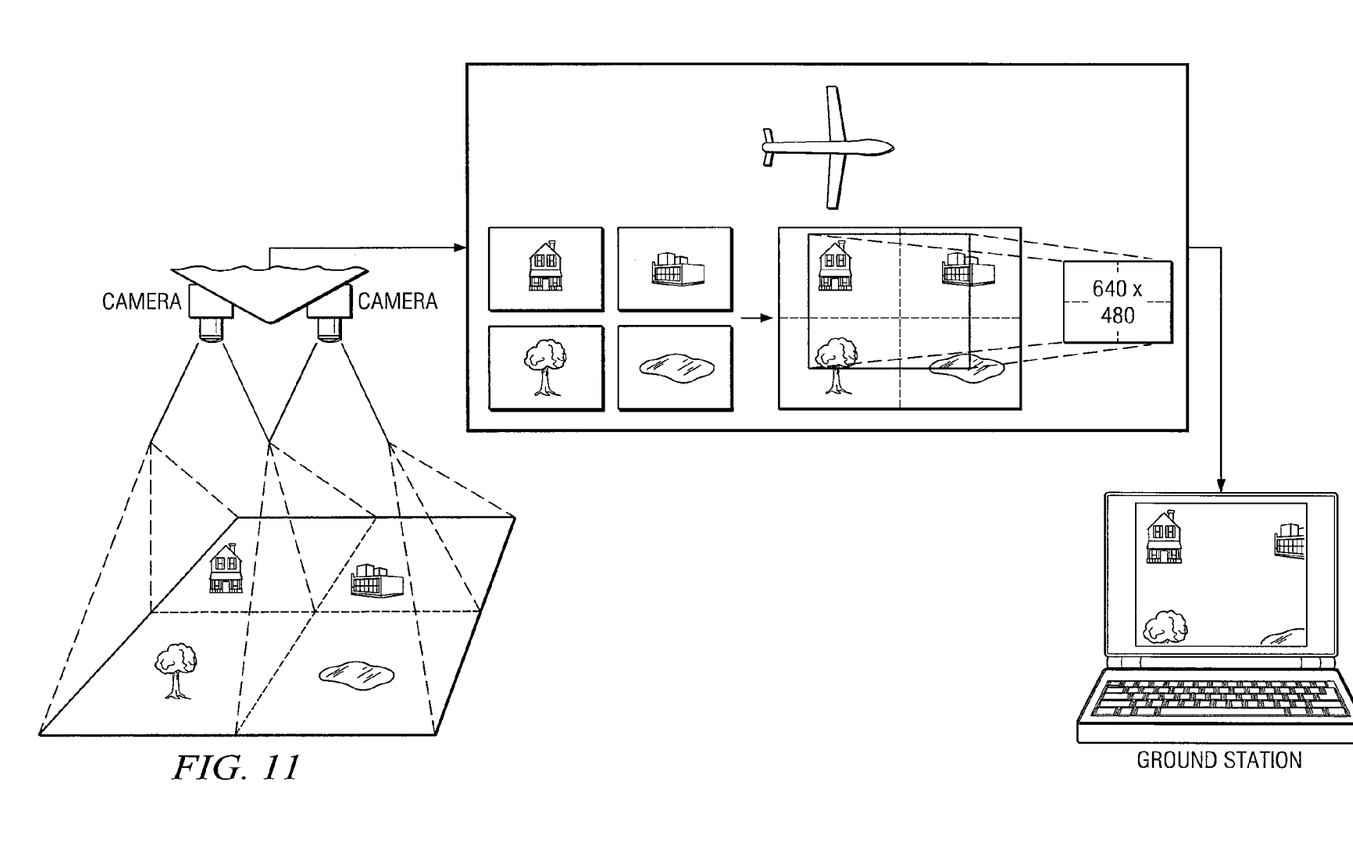
FIG. 11 illustrates a region of interest (ROI) view (Mode 3 of FIG. 8).

FIG. 11 illustrates a region of interest (ROI) view (Mode 3 of FIG. 8). The user may select a ROI from anywhere in the full view. The ROI mode allows for pan, tilt, and zoom capabilities. This mode makes use of the total area of view and allows the user to select a given ROI, which is down sampled to 640×480 pixels to be sent to the ground station. As with the previous modes, lens distortion methods as well as other image processing techniques are applied.

Where camera unit 11 has a single image sensor rather than a sensor array, a wide field of view lens allows for a wide variety of ROIs to be read out of the image sensor. A high-resolution narrow field of view region, or a low-resolution wide field of view region can be selected by the user.

Modes 4, 4a, and 4b are multiple FOV modes, which allow the user to observe more than one view from a single imager. Multiple FOV Modes include History Mode, Slideshow Mode, and Custom Slideshow Mode. Mode 4 is a Slide Show mode, which presents a series of stored images. Slideshow Mode will display the entire 100 degree FOV in full detail at one frame per second. Mode 4a is a History Mode, in which every second the imager will send twenty nine frames of a zoomed in FOV, and one frame of zoomed out FOV. A second window will display the zoomed out FOV, while the zoomed in FOV is viewed in the original window. Custom Slideshow Mode 4a will display an arbitrary FOV in full detail at an intermediate frame rate.

The History mode, Mode 4a, may be used to allow the user to store image data of all of the observed area. In this mode, all image data (12+ megapixels of 120 degrees FOV) is sent down to the ground station as separate frames. The entire frame's worth of data will require a transmission time of at least 1.5 seconds. A mosaic picture containing all camera views from a flight can be stitched together.

Modes 6 and 8 are tracking modes. A small UAV is subject to altitude variation, which further complicates the image data collection problem. Tracking of ROIs and objects of interest (OOIs) within the selected ROI allow for stabilization, pointing, and greater information content without increasing the communication bandwidth. Thus, in Mode 6, a tracking algorithm is used to track the ROI selected in Mode 3. In Mode 8, an OOI is selected and tracked. The tracking is implemented with appropriate programming of processing unit 22, which include appropriate input from the UAV so that the tracking can accommodate the flight pattern (direction, altitude, speed, etc) of the UAV.

Mode 6 is a ROI Tracker Mode. In ROI Tracker Mode the imager focuses on a particular ROI. Mode 6a is a Step Stare Mode, which focuses on a particular ROI for a few seconds as the UAV flies forward. After the allotted time has passed, the Imager focuses on the region immediately in front of the original ROI, in the direction that the UAV is flying. After the allotted time, the imager 21 focuses on a third region. In this manner, the imager will view a continuous path while staring at each step for a few seconds.

To implement the Step Stare Mode 6a, processing unit 22 is programmed to receive data representing the movement of the UAV and to move the ROI based on this UAV movement data.

Mode 6b is a Multiple ROI Mode, which tracks multiple ROIs in separate windows. The multiple ROIs will either be physically smaller, or will be 640 by 480 pixels at a reduced frame rate.

Mode 7 is a Fixed Area Zoom mode, which allows the imager to view the same physical area on the ground as the UAV changes altitude. As the UAV increases in altitude, it views the same area on the ground. The processing unit 22 will calculate the desired zoom level based on the state of the aircraft.

Mode 8a is a Route Tracking Mode, in which the viewed region is selected based on a pre-determined route which is mapped out on a GPS map. Given the desired GPS position to view and the current GPS position, processing unit 22 determines the desired ROI. The UAV flight control software can be modified to cause the UAV to fly such that the desired route to be imaged is within the field of view of the camera unit 11.

The control station 14 can be programmed to calculate the desired region of interest, and to convey the relevant information to the camera unit 14 and the flight control software.
Alternative Embodiments of Imager Referring again to FIG. 2, as alternative to sensor arrays, imager 21 could be implemented with a single image sensor, in particular, an image sensor having a wide FOV. Desirable characteristics for a single sensor imager 21 are region-of-interest electronic readout, a large number of pixels, low power consumption, low noise, fast readout, and low cost. There is a tradeoff with pixel pitch, because a larger pixel pitch has a higher quality, but is physically larger and heavier, and requires a larger, heavier lens. Desirable characteristics for a lens are a wide field of view, high resolution, low distortion, small F-number, and low cost.

For a single sensor implementation of imager 21, an example of a suitable sensor is a CMOS sensor, such as the 5.2 Mpixel sensor manufactured by Omnivision, which has a lens format size of ½", an active pixel array of 2592×1944, a sensor diagonal of 9.1 mm, a pixel pitch of 2.775 micron, a lens weight of 2.3 oz., and a frame rate of 30 frames/second at a resolution of 640×480 pixels.

Furthermore, analog rather than digital sensors could be used. For example, one or more CCD sensors could be used, and their analog output converted to digital form for processing.

Existing image sensors, CCD as well as CMOS, are available in numerous configurations. The pixel sizes range from approximately 2 mm to 5 mm on each side. The number of pixels from a sensor range from VGA quality (640×480 pixels) to megapixel quantities.

Imager 21 could also be implemented with infrared sensors for use at night. For example, imager 21 could consist of an array of infrared image sensors.
Lens Selection, Resolution and Pixel Quality For UAV surveillance applications, it is important that the images are sufficient to detect objects of interest. Given the flight parameters for the UAVs and the operating specifications of camera unit 11, it is possible to evaluate the performance of the cameras.

In its full field of view mode (Mode 2), camera unit 11 returns a 640×480 image based on data from all four cameras. If a UAV is flying at 1000 feet, it should cover a horizontal viewing distance of over 3400 ft for a 120° horizontal field of view. At a height of 300 feet, the horizontal viewing distance is approximately 1040 feet. Considering a full field 640×480 image or a 12 MP image that can be zoomed, how well the observer might be able to detect or identify objects in the flight path of the UAV can be evaluated. Using these numbers, estimates of pixel density at different zoom levels and heights can be obtained in pixels per foot.

| | Height | |
|---|---|---|
| Field of View | 300 ft | 1000 ft |
| Full Field | 0.615 pixels/ft | 0.185 pixels/ft |
| Zoomed | 4 pixels/ft | 1.15 pixels/ft |

One evaluation method for identifying the number of pixels required to positively detect, recognize, or identify an object in an image is known as Johnson's Criteria. Johnson's Criteria is a way of expressing the likelihood of a quality observation based on the level of detail present in an image. The levels of observation and their required detail to obtain a 50% chance of observation are:

Detection—an object is present: 2+1/−0.5 pixels
Orientation—symmetrical, asymmetric, horizontal or vertical: 2.8+0.8/−0.4 pixels
Recognition—the type object can be discerned, a person vs. a car: 8+1.6/−0.4 pixels
Identification—a specific object can be discerned: 12.8+3.2/−2.8 pixels The characteristic length of an object is its geometric mean. So a person with a 1 ft×2 ft profile has a critical target dimension of Lc=(LXLY)⅓. Similarly, a small car might have a critical length of 7 ft, and a small building might have a critical length of 25 ft. Using these numbers it is possible to compute the quality of observation for some sample objects.

Figure 12:
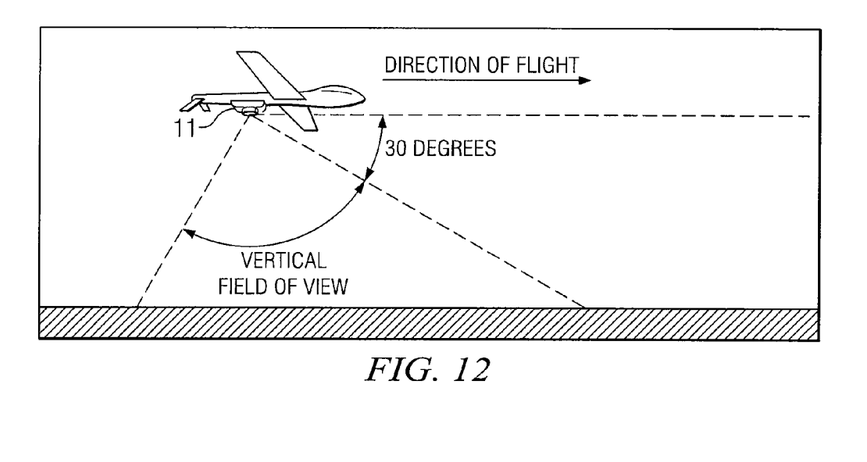
FIG. 12 illustrates a camera unit on an in-flight UAV, and the basis for tradeoff between the field of view and the ground resolution.

FIG. 12 illustrates a camera unit 11 on an in-flight UAV, and the basis for tradeoff between the field of view and the ground resolution. A wider field of view permits a larger viewing area, at the expense of resolution. Increasing the number of pixels allows an increase in field of view, an increase in resolution, or both. The camera unit 11 is mounted looking downward such that the top of the sensor looks at an angle of 30 degrees from parallel. "Vertical resolution" is the resolution in the direction of flight, and "horizontal resolution" is the resolution perpendicular to the direction of flight.

Figure 13:
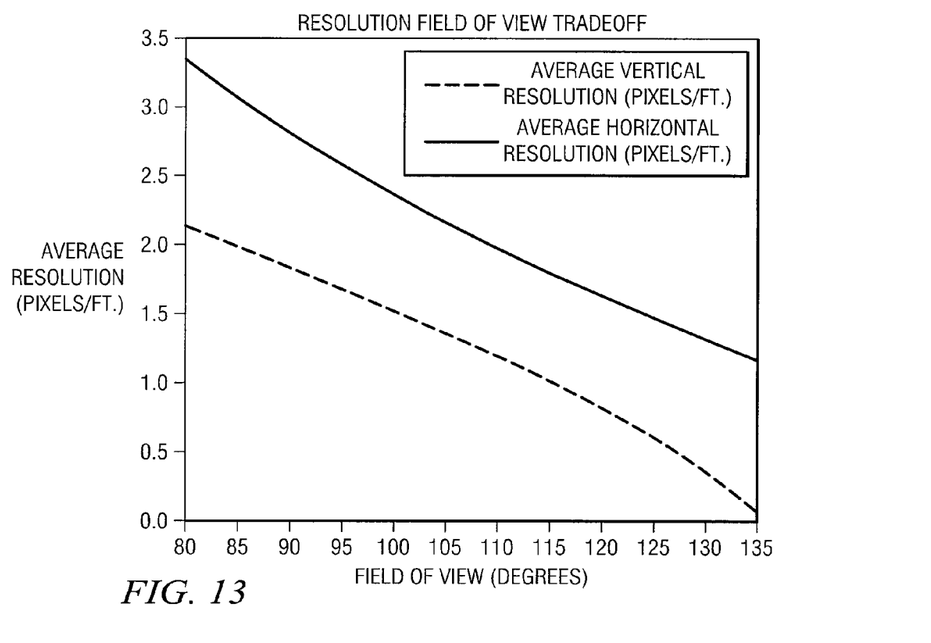
FIG. 13 further illustrates the resolution versus field of view tradeoff for UAV imaging applications.

FIG. 13 illustrates the resolution versus field of view tradeoff for UAV imaging applications. Both horizontal and vertical resolutions decrease as field of view increases. Vertical resolution is smaller than the horizontal resolution due to the forward angle of the camera. As the angle increases in any direction, resolution decreases, since the camera is looking forward, the resolution in this direction is lower.

For a sensor diagonal length w and lens focal length f, the field of view is:

$$FOV = 2 \arctan(w/2f).$$

A lens with the widest field of view that gives a desired resolution is selected.

For a single sensor imager 21, the widest reasonable field of view lens compatible with a first selected image sensor has a field of view of 107 degrees. This imager configuration has an average vertical resolution of 1.4 pixels/foot and an average horizontal resolution of 2.2 pixels/foot. The widest field of view lens compatible with a second selected imager has a field of view of 103 degrees. This imager configuration has an average vertical resolution of 1.3 pixels/foot, and an average horizontal resolution of 2.1 pixels/foot.

If the UAV flys high above the ground and greater detail is desired, one option to increase pixel density is to use a smaller horizontal FOV for camera unit 11. With a 75° horizontal FOV, the minimum and maximum pixel densities increase to 8.7 and 0.42 pixels per foot respectively.

What is claimed is:

1. An optical imaging system, for mounting on an aircraft for airborne image capture of the ground and for delivery of pictorial images to a remote image control station, comprising:
   a camera unit having at least four image sensors, all sensors being identical, mounted on the underside of the aircraft;
   wherein each sensor has an associated lens and is mounted on the underside of the aircraft with its lens to provide a fixed field of view for each sensor;
   wherein each sensor is oriented on a surface of the underside that is non-planar to the ground, such that images from the sensors appear tilted with respect to one another in the absence of transformation processing;
   wherein the optical axis of each sensor has a predetermined and non-perpendicular angle of incidence with the ground different from that of one or more of the other sensors;
   wherein the sensors are arranged in an and operable to simultaneously acquire different but adjacent images such that they may be stitched together to provide a full field image having a combined larger field of view;
   a processing unit for processing pixel data from the sensors and for interpreting command signals from the image control station;
   wherein the processing unit is programmed to perform image processing tasks including at least a transformation process to map the simultaneously acquired images from each sensor to a common plane having the combined larger field of view;
   wherein the transformation process is a projection transformation process applied to each image from the sensors to compensate for the different angles of incidence of the sensors, and is unique for each sensor orientation;
   an encoder for formatting the pixel data into a National Television System Committee (NTSC) signal having a series of frames of pixel data;
   a receiver for receiving control signals from the image control station and a transmitter for delivering the NTSC signal to the image control station;
   wherein the control signals comprise at least a set of viewing mode control signals that determine which mode from a set of viewing modes is to be a viewing mode of the image to be transmitted to the control station;
   wherein the set of viewing modes comprise at least: a full field of view mode, a region of interest mode, which provides an image within the full field of view, and a fixed area zoom mode, which provides an image of the same physical area on the ground as the aircraft changes altitude;
   wherein the set of viewing modes further comprise a tracking mode for tracking a region of interest, and wherein the tracking mode is performed by repeatedly changing the region of interest by shifting the region of interest across the full field of view in the direction of the flight of the aircraft; and
   wherein the processing unit interprets a viewing mode control signal to determine which pixels of the full field of view to transmit to the image control station.

2. The system of claim 1, wherein the control unit is implemented with at least a universal asynchronous receiver/transmitter (UART).

3. The system of claim 1, wherein the processing unit is programmed to poll the radio unit to determine if control signals have been received.

4. The system of claim 1, wherein the control signals represent commands to zoom, pan, or tilt the image.

5. The system of claim 1, wherein the camera unit has multiple sensors, and the control signal represents a command to pan, tilt, or zoom the image from any of the sensors.

6. The system of claim 1, wherein the viewing modes include at least a tracking mode for tracking a region of interest, and wherein the tracking mode accommodates the flight of the aircraft.

7. The system of claim 1, wherein at least one of the modes is a route tracking mode, which provides images of a predetermined route on the ground.

8. The system of claim 1, wherein the camera unit has a field of view based on an expected flight altitude and a desired pixel density per foot on the ground.

9. The system of claim 1, wherein the set of pixels for each frame for each mode are the same in number, such that the same number of pixels is transmitted from the processing unit regardless of mode.

10. The system of claim 1, wherein the region of interest mode provides an image with pixel data from at least two different sensors.

11. The system of claim 1, wherein the combined field of view covers at least 120 degrees horizontally.

12. A method of capturing pictorial images from an unmanned aircraft for airborne image capture of the ground and for delivery of the images to a remote image control station, comprising:

mounting at least four image sensors, all sensors being identical, mounted on the underside of the aircraft;

wherein each sensor has an associated lens and is mounted on the underside of the aircraft with its lens to provide a fixed field of view for each sensor;

wherein each sensor is oriented on a surface of the underside that is non-planar to the ground, such that images from the sensors appear tilted with respect to one another in the absence of transformation processing;

wherein the optical axis of each sensor has a predetermined and non-perpendicular angle of incidence with the ground different from that of one or more of the other sensors;

wherein the sensors are arranged and operable to simultaneously acquire different but adjacent images such that the images may be stitched together to provide a full field image having a combined larger full field of view;

programming a processing unit on board the aircraft to process pixel data from the sensors and to interpret command signals from the image control station;

wherein the processing unit is programmed to perform image processing tasks including at least a transformation process to map the simultaneously acquired images from each sensor to a common plane having the combined larger full field of view;

wherein the transformation process is a projection transformation process applied to each image from the sensors to compensate for the different angles of incidence of the sensors, and is unique for each sensor orientation;

using an on-board encoder to format the pixel data into a National Television System Committee (NTSC) signal having a series of frames of pixel data;

using an on-board receiver to receive control signals from the image control station and a transmitter for delivering the NTSC signal to the image control station;

wherein the control signals comprise at least a set of viewing mode control signals that determine which mode from a set of viewing modes is to be a viewing mode of the image to be transmitted to the control station;

wherein the set of viewing modes comprise at least: a full field of view mode, a region of interest mode, which provides an image within the full field of view, and a fixed area zoom mode, which provides an image of the same physical area on the ground as the aircraft changes altitude;

wherein the set of viewing modes further comprises a tracking mode for tracking a region of interest, and wherein the tracking mode is performed by repeatedly changing the region of interest by shifting the region of interest across the full field of view in the direction of the flight of the aircraft; and wherein the processing unit interprets a viewing mode control signal to determine which pixels of the full field of view to transmit to the image control station.

\* \* \* \* \*